United States Patent
Harris

(10) Patent No.: US 7,685,822 B1
(45) Date of Patent: *Mar. 30, 2010

(54) ROTARY CUP FUEL INJECTOR

(75) Inventor: Mark M. Harris, Juno Beach, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 795 days.

This patent is subject to a terminal disclaimer.

(21) Appl. No.: 11/271,731

(22) Filed: Nov. 9, 2005

(51) Int. Cl.
*F02C 7/22* (2006.01)
(52) U.S. Cl. .......................... 60/745; 415/90
(58) Field of Classification Search .............. 60/740, 60/743, 744, 745; 415/89, 90
See application file for complete search history.

(56) References Cited

U.S. PATENT DOCUMENTS

| | | | |
|---|---|---|---|
| 2,177,245 A | 10/1939 | Dennis | |
| 2,569,563 A * | 10/1951 | Grantham | 415/90 |
| 2,617,252 A * | 11/1952 | Klein | 60/744 |
| 2,705,401 A | 4/1955 | Allen et al | |
| 3,381,471 A | 5/1968 | Szydlowski | |
| 3,828,574 A | 8/1974 | Boy-Marcotte et al | |
| 3,983,694 A | 10/1976 | Bracken, Jr. | |
| 4,040,251 A | 8/1977 | Heitmann et al. | |
| 4,870,825 A | 10/1989 | Chapman | |
| 4,996,838 A | 3/1991 | Melconian | |
| 5,323,602 A | 6/1994 | Defever | |
| 5,526,640 A | 6/1996 | Brooks et al. | |
| 6,269,647 B1 | 8/2001 | Thompson, Jr. et al. | |
| 6,925,812 B2 | 8/2005 | Condevaux et al. | |
| 2007/0234733 A1 * | 10/2007 | Harris et al. | 60/776 |

* cited by examiner

*Primary Examiner*—Louis J Casaregola
(74) *Attorney, Agent, or Firm*—John Ryznic

(57) ABSTRACT

A rotary cup fuel injector for use in a gas turbine engine, the rotary cup injector being rotatably secured to the rotor shaft and positioned radially inward of the combustor, the rotary cup injector having a front face with a parabolic shape and a rear face with a slanted and flat shape. The front and rear faces of the injector form a thin film of fuel on the surfaces and—because of the high rotational speed—produce fine droplet's of fuel to be injected into a combustion chamber. The two faces inject fuel into two combustion zones of the combustor.

2 Claims, 1 Drawing Sheet

ROTARY CUP FUEL INJECTOR

BACKGROUND OF THE INVENTION

1. Field of the Invention

The present invention relates generally to a small gas turbine engine, and more specifically to a rotary fuel injector to supply fuel and air to the combustor.

2. Description of the Related Art Including Information Disclosed Under 37 CFR 1.97 and 1.98

Small gas turbine engines of the kind used in Unmanned Air Vehicles (UAV) such as a small cruise missile or a drone are well known in the art. These turbines produce a thrust from less than 300 lbs to several hundred lbs. Because these turbine engines must fit within a small space, they tend to be very compact. Since the engine must be compact in size, the combustor must be as small as possible. However, the combustor must provide a long enough burn path to remain lit, and to burn the fuel to produce power without wasting unburned fuel. In small combustors, the fuel droplets size must be small in order to burn in the smaller combustor sections in which the fuel particle residence time for burning the particles is short. Larger fuel particles will take longer to burn and in a small combustor will not burn completely. Effective us of the available volume must be made so that the combustor is able to provide the required heat output over a range of engine operating speeds and flight conditions.

Small expendable gas turbine engines also suffer from poor specific fuel consumption (SFC), which limits the engine to unnecessarily short range and loiter times. Small engines suffer from restricted flight/starting envelopes and operating speeds due to combustor flame-out limitations.

Cup shaped fuel slingers are well known in the art. U.S. Pat. No. 3,983,694 issued to Bracken, Jr. on Oct. 5, 1976 and entitled Cup-Shaped Fuel Slinger shows a slinger to radially sling fuel from a cup shape reservoir and into a combustion zone. The cup includes a lip on a radial outer wall of the cup, and the fuel is forced over the lip by centrifugal force due to rotation of the cup. Other rotary fuel injectors include U.S. Pat. No. 4,870,825 issued to Chapman on Oct. 3, 1989 entitled Rotary Fuel Injection System which includes a hydraulic fuel trap within a U-shaped of the rotary cup; and U.S. Pat. No. 4,040,251 issued to Heitmann et al. on Aug. 9, 1977 entitled Gas Turbine Combustion Chamber Arrangement.

Other types of fuel injection include fuel injectors such as U.S. Pat. No. 3,381,471 issued to Szydlowski on May 7, 1968 entitled Combustion Chamber For Gas Turbine Engines where an injection wheel 27 injects fuel into the combustion space 24 for burning; U.S. Pat. No. 4,996,838 issued to Melconian on Mar. 5, 1991 entitled Annular Vortex Slinger Combustor shows a fuel nozzle for radial outward injection of fuel. U.S. Pat. No. 6,925,812 issued to Condevaux et al. on Aug. 9, 2005 entitled Rotary Injector shows a fuel slinger 20 for slinging fuel into a combustion zone, and a rotary injector 10 having a plurality of injection ports each axially offset and each with a shorter radius in the downstream direction of the engine for injecting fuel into the afterburner section.

U.S. Pat. No. 2,705,401 issued to Allen et al. on Apr. 5, 1955 entitled Vaporizing Means For Liquid Fuel Combustion Chambers shows a generally frustoconical disc-like member 18 with a concave face downstream and concentrically stepped in which fuel is supplied through a pipe 19 to an axial well 20 of the member 18, the well having an annular lip 21 over which the liquid fuel is centrifuged onto the stepped face as a thin film and is vaporized by the heat in the flame chamber. Any fuel remaining unvaporized when it reaches the next radially outer step 22 (which may be undercut) builds up and is centrifuged over the latter for vaporization on the succeeding conical annulus.

An object of the present invention is to provide a rotary cup injector with improved fuel break-up ability and to allow for the use of heavier and contaminated fuels in a small gas turbine engine.

Another object of the present invention is to provide a rotary cup injector with fuel atomization for unassisted cold ignition without the need of expensive and heavy start assist systems.

Still another object of the present invention is to provide a rotary cup injector with rapid vaporization combined with good combustor pressure drop to improve vaporization and mixing of liquid fuels.

BRIEF SUMMARY OF THE INVENTION

The present invention is a small gas turbine engine with a rotary cup fuel injector, the rotary cup fuel injector is rotatably connected to the shaft of the compressor and the turbine associated with the combustor of the compressor and turbine, the rotary cup injector having a front face on which a fuel is delivered in a film-like manner to one zone in the combustor and a rear face on which a fuel is delivered in a film-like manner to a second zone in the combustor. The front face of the rotary cup injector is concaved shape, and the rear face is substantially flat. Fuel can be delivered to the two faces either by a fuel line discharging upstream of the face, or through an internal passage in the shaft. The rotary cup injector provides excellent fuel break-up and large fuel passage sizes in order to extend this capability to fuels heavier (and potentially more contaminated) than those typically compatible with turbines, provides faster fuel evaporation resulting from rotary cup fuel injection, fuel atomization for unassisted cold ignition, and reliable ignition and rapid acceleration without the need for expensive and heavy start assist systems and ignition systems. Combining rapid vaporization with a healthy combustor pressure drop ensures that both vaporization and mixing of liquid fuels will be rapid at all conditions

DETAILED DESCRIPTION OF THE INVENTION

Figure 1:
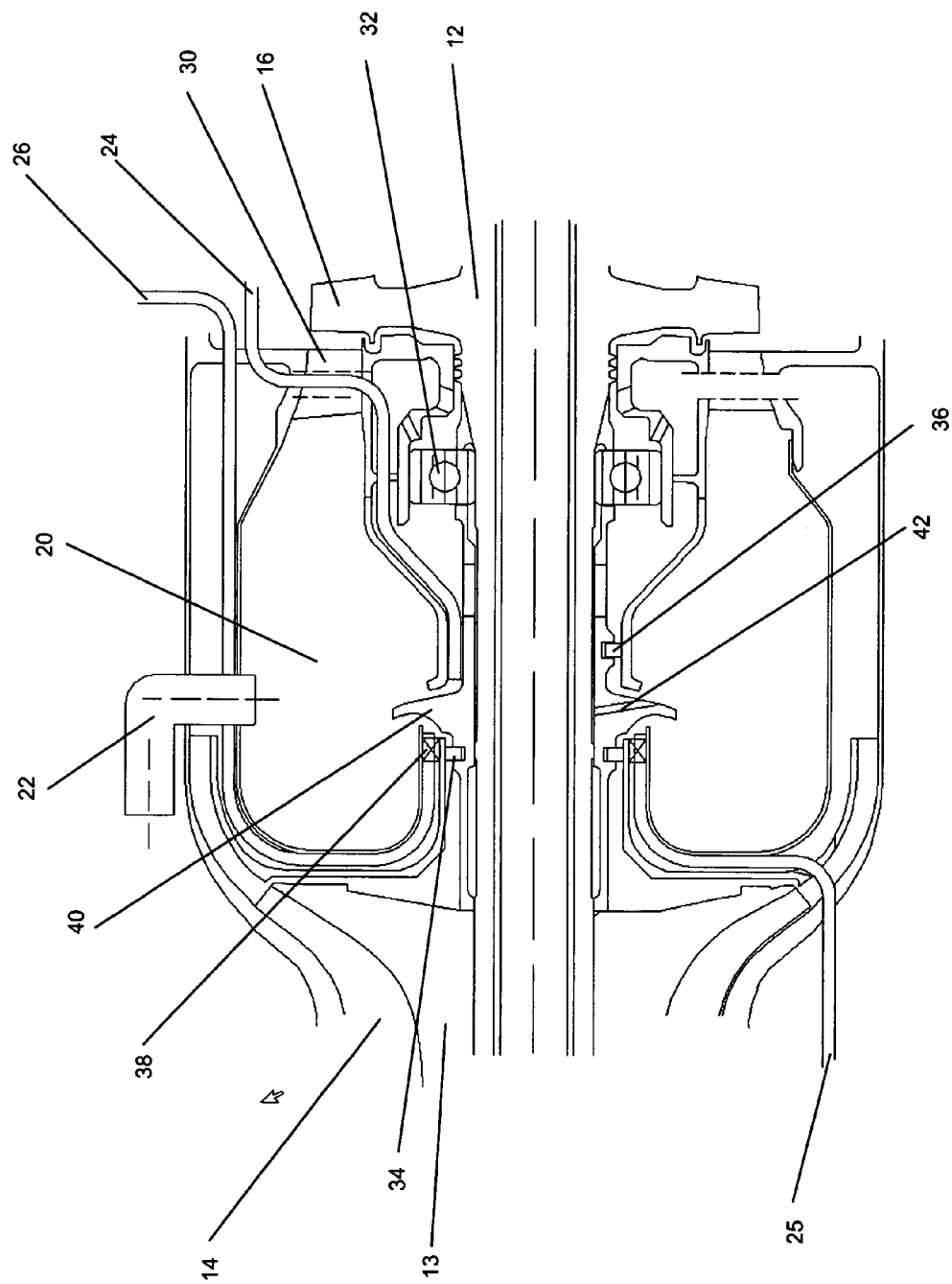
FIG. 1 shows a cross section view of a gas turbine engine with a rotary cup fuel injector of the present invention.

Referring to FIG. 1, the gas turbine engine includes a rotor shaft 12 with a turbine 16 connected at one end, and a compressor disc 13 with compressor blades 14 connected at the other end. A rotary cup fuel injector 40 is rotatably secured to the shaft 12 between the compressor 14 and the turbine 16 in order to inject fuel into a combustor 20. The rotor shaft 12 is supported for rotation by a bearing 32. The rotary cup injector 40 includes a front side having a parabolic shaped face curving in a forward direction of the engine, and a rear side having a generally flat face slanting toward the front of the engine. The front and rear faces of the injector 40 can be smooth or have vanes or radial grooves to aid in swirling the combustion internal flow. The front and rear face both function to spread the fuel into a thin film such that the fuel is broken up into small particles before being injected into the combustor. A nozzle 30 directs the combustion gas to the turbine blade 16. An igniter 22 ignites the fuel and air at a stagnation point in the combustor 20. A swirl vane 38 adds a swirl to the air flow from the compressor into the combustor. Piston ring seals 34 and 36 provide an air seal between the rotary shaft 12 and the wall of the combustor 20.

The rotary cup fuel injector 40 front face and rear face formed on opposite sides of a single radial extending portion of the rotary cup injector that extends out into the combustion chamber. The two faces are both uncovered so that both faces are exposed to the outside and an enclosed fuel passage on the front and the rear faces is not formed. Also, both faces are directed to discharge the film of fuel outward in more of a radial direction than in an axial direction in comparison to the rotating axis of the rotary cup fuel injector 40. The purpose for this is to discharge the fuel and the air toward the opposite side of the combustor wall to induce the vortex flow motion in the primary zone and the secondary zone of the combustion chamber.

Fuel can be delivered to the faces of the rotary cup injector by fuel lines 24 and 26 from the rear of the engine, or with a fuel line 25 from the front of the engine, or fuel can be delivered through a passage in the shaft and through a passage 42 within the rotary cup.

Operation of the rotary cup fuel injector in the gas turbine engine is as follows. The compressor 14 discharges compressed air which is divided into a forward air flow around the front of the combustor and a rearward air flow around the rear of the combustor 20. The air flow around the front of the combustor passes through the swirl vane 38 and onto the front face of the rotary cup injector 40, and into a front combustor zone. The air flow around the rear of the combustor passes through a cooling passage in the nozzle 30, through a rear bearing 32, and into the rear face of the rotary cup injector 40, and then into a rear combustor zone. Fuel is delivered to the front face of the rotary cup injector 40 by either a fuel line 26 originating from a rear section of the engine or from a fuel line 25 originating from a front section of the engine. Fuel is delivered to the rear face of the rotary cup injector 40 from a fuel line 24 originating from the rear of the engine. The fuel in the lines is discharged as liquid onto the faces of the injector 40. Due to the rotational speed of the injector 40, the liquid is forced into a thin film and injected into the zones as small droplets. Rotation of the rotary cup injector 40 also draws the compressed air from the compressor into the combustion chamber 20. The igniter 22 will start the burn process. The combustion gas exits the combustor 20 through the nozzle 30 and onto the turbine blade 16 which rotates the shaft 12 and drives the compressor 14 and the rotary cup injector 40.

Because of the rotary cup injector 40 of the present invention, a small pump can be used to deliver fuel to the combustion chamber 20. The rotary cup injector provides the necessary power to sling the fuel without the need to provide a high pressure force to deliver the fuel.

I claim:

1. A rotary cup fuel injector, comprising:
   a rotor shaft;
   a rotary cup injector rotatably secured to the shaft;
   the rotary cup including a front face fuel injecting surface for injecting a thin film of fuel into a forward chamber of a combustor;
   the rotary cup including a rear face fuel injecting surface for injecting a thin film of fuel into an aft chamber of the combustor; and,
   a compressor secured to one side of the rotor shaft, and a turbine secured to an opposite side of the rotor shaft, the compressor and the turbine rotating together with the rotary cup injector.

2. The rotary cup fuel injector of claim 1, and further comprising:
   the forward face having a concave shape; and,
   the aft face having a forward slanted shape.

* * * * *